April 28, 1931. F. DE NARDE 1,802,808
PROPELLER
Filed Sept. 12, 1928
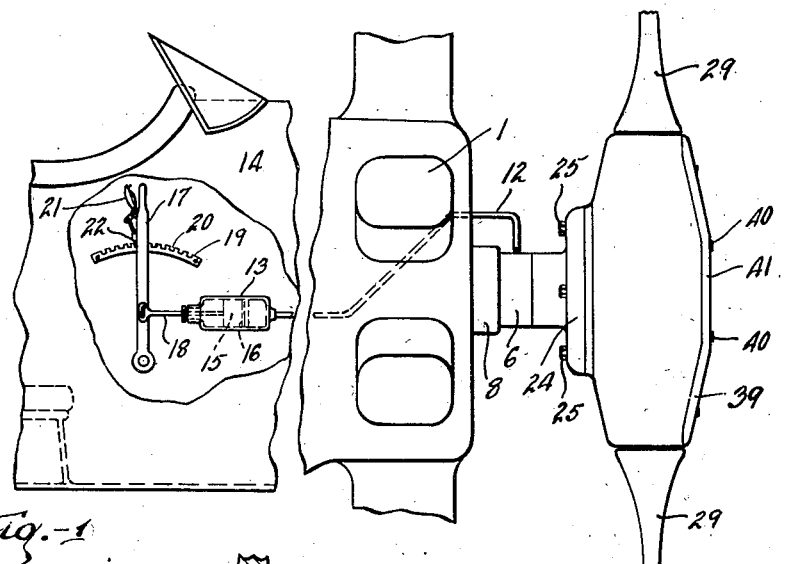
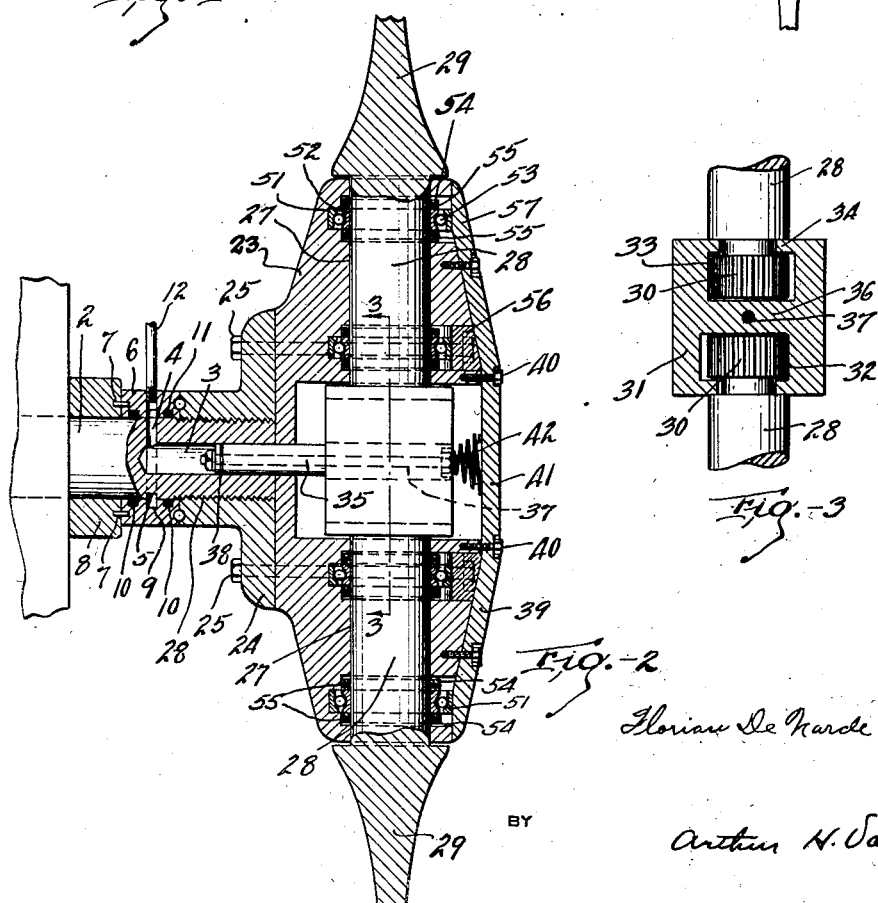
Florian De Narde, INVENTOR
BY Arthur H. Van Horn,
HIS ATTORNEY Patented Apr. 28, 1931

1,802,808

UNITED STATES PATENT OFFICE

FLORIAN DE NARDE, OF CLEVELAND, OHIO

PROPELLER

Application filed September 12, 1928. Serial No. 305,344.

My invention is an improvement in propellers for aircraft and other vehicles and relates more particularly to means for adjusting the pitch of the propeller blades while the propeller is in operation.

One of the objects of my invention is to enable the operator of the vehicle to which my propeller is applied to vary the pitch of the blades to control the speed and direction of movement of the vehicle without varying the speed of the engine.

Another object of my invention is to reduce the head resistance of the vehicle by providing a compact, light and enclosed means for varying the pitch of the propeller blades.

A further object of my invention is to provide means for assisting in restoring the blades to a predetermined angular relation.

Other objects and advantages of my invention will become more apparent as the following description of the same progresses, reference being made to the accompanying drawings in which like reference characters are employed to designate like parts throughout the same.

Figure 1 is an elevation of my invention partly broken away, and shown as applied to an airplane.

Figure 2 is a vertical section of a portion of the apparatus shown in Figure 1, and, Figure 3 is a detailed section taken on line 3—3 of Figure 2.

In carrying out my invention, I employ means such as is illustrated in the drawings and which is preferably operated by pressure exerted on a confined fluid to vary the pitch of the propeller blades.

In the drawings illustrating the preferred embodiment of my invention, a radial cylinder or other type motor is shown at 1. The motor shaft 2 is bored axially inwardly a short distance from its outer end forming a cylinder 3. A fluid passage 4 is formed through the shaft and connects the cylinder 3 with an annular groove 5 about the periphery of the shaft (see Fig. 2). I provide a collar or sleeve 6 on the shaft, the said sleeve being locked against rotation about the shaft by means of the pins 7 entering seats in the adjacent portion of the motor casing 8. This sleeve is also provided with annular grooves 9 and 10 on its inner wall, the groove 9 registering with the groove 5 to form an annular fluid passage about the shaft. Packing means 11 of suitable material is carried in the grooves 10 on each side of the groove 9 to prevent leakage of the fluid under pressure past these points. One end of a fluid feed conduit 12 communicates with the groove 5 of the sleeve and supplies oil or other fluid under pressure to the cylinder 3. The other end of the conduit 12 communicates with a cylinder 13 in the cockpit 14. A plunger 15 movable within the cylinder 13 and suitably packed as at 16, is operated by means of a lever 17 and link 18 (see Fig. 1). This lever moves over a quadrant 19 having suitable stops or notches 20 and may be locked in the desired position with respect to the quadrant by means of the lever 21 and the dog 22.

Referring now more particularly to Figure 2, I provide a hub or housing 23 which is preferably a casting of light, durable metal or alloy such as what is known as duraluminum. This casting is rigidly secured to a shouldered back plate 24 by the bolts 25. The back plate is screw threaded as at 26 to the motor shaft and rotates therewith, the plate being threaded in a direction opposite to the direction of rotation of the motor shaft to prevent accidental displacement while in use.

Aligned openings 27 are formed in the hub or housing to receive the propeller shafts 28 which are freely rotatable therein. Propeller blades 29 are formed on the outer ends of the respective shafts 28 and pinions 30 are keyed to the inner ends of the said shafts. It will be noted that the portions of the shafts to which the pinions are keyed are of reduced diameter and that the overall diameter of each pinion is slightly less than the diameter at the major portions of the respective shafts. This will permit the removal of the shafts axially from the bearings and housing for replacement or repair.

I have provided for varying the pitch of the blades 29 which, in the present embodiment of my invention is actuated by pressure transmitted through the medium of a fluid. This means includes a substantially H shaped rack frame 31 which is illustrated more particularly in Figure 3, and which is provided with racks 32 and 33 arranged on opposite sides thereof and of the axes of the respective shafts 28. The arms of the rack frame are each provided with flanges 34 which extend toward the reduced portions of the shafts 28. An elongated plunger 35 is secured to the cross arm 36 of the rack frame by means of a bolt 37 and extends rearwardly into the cylinder 3 formed in the end of the motor shaft 2. Suitable packing is provided at 38 to prevent leakage of the fluid past the plunger 35. When pressure is exerted on the fluid in the cylinder 3 by operating the lever 17, the piston 35 and the frame move outwardly as a unit thus rotating the propeller shafts 28 through the racks and pinions.

A cover plate 39 is provided for the hub or housing 23 and is removably secured thereto by a plurality of bolts 40. This cover plate is shaped to conform to the configuration of the housing at points at which they contact, the central portions being preferably flat as at 41. A spring 42 is carried by the cover plate and exerts its compression against the H shaped rack frame 31 to normally move it toward the driven shaft 3. However the compression of this spring is readily overcome when the lever 17 is operated to force the plunger 35 to the right in Fig. 2. When the rack frame 31 is in a position to the extreme left (Fig. 2), the blades of the propeller will be disposed at a relative angular position to each other corresponding to a maximum pitch in one direction, and upon gradual movement of the frame to the right by moving the lever 17, this pitch may gradually be decreased to zero (in the position shown in Fig. 2) and again increased to maximum in the opposite direction. The movement to a maximum pitch of the blades in this opposite direction will be accompanied by a movement of the rack frame to an extreme position to the right in Fig. 2 against the compression of the spring 42. In returning the blades to their original positions, the lever 17 is moved in the opposite direction whereupon the fluid will be drawn back into the cylinder 13 and the piston 35 and rack frame will be shifted to the left toward the driven shaft 3. Movement of the frame 31 to the left is assisted by the compression of the spring 42.

I have provided suitable means for rotatably supporting the shafts 28 in the hub and for taking up the thrust which is created when the entire assembly is rotating with the driven shaft 3. This means includes one or more bearings suitably located in the hub or housing. Each bearing consists of an outer race 51 snugly fitted within recesses formed in the housing, while the inner race 52 is snugly fitted to the shaft 28. These races are spaced by means of ball bearings 53. Retainer rings 54 are detachably secured to the shafts 28 on each side of the inner race by means of set screws 55, to lock the inner races on the shafts against axial movement. The outer races of the inner bearings of each shaft are held against displacement by the follower blocks 56 and the cover plate 39, while those of the outer bearings are secured in position by the ends 57 of the cover. In this manner the shafts may be rotatably supported within the hub and disassembled therefrom simply by removing the cover plate and the blocks 56 and then loosening the set screws 55 of the retainer rings. The shafts may then be withdrawn axially and the bearings and retainer rings removed through the openings in the front of the housing.

In operation, assuming the parts are in the respective positions shown in the drawings, when it is desired to adjust the propeller blades to their maximum pitch in one direction, the operator grasps the levers 17 and 21 and releases the dog 22 from one of the notches 20 in the quadrant 19. He then pulls the lever 17 to the left in Fig. 1. In this manner the piston 15 will draw the oil or other fluid into the cylinder 13 through the conduit 12. The fluid being partially removed from the cylinder 3 in the driven shaft, the plunger 35 is withdrawn within the cylinder. The rack frame 31 is consequently moved to the left and the shafts 28 are rotated in opposite directions simultaneously to their maximum pitch in one direction. The movement of the rack frame to the left is assisted by the compression spring 42, between the cover plate and the rack frame.

When the lever 17 is moved to the right the pressure exerted on the lever is transmitted through the fluid to the plunger 35 to move it to the right against the compression of the spring 42, rotating the blades in opposite directions toward their limit of movement, defining the maximum reverse pitch.

The notches 20 in the quadrant are provided so that the desired pitch of the blades may be selected and the lever 17 locked in the desired position. These notches may be arranged close together to permit relatively fine adjustments of the blades.

It is obvious that with my invention one is enabled to control the speed of an airplane by selecting the desired pitch for the blades, either before the take-off or during flight. It is also obvious that my invention provides positive means whereby the operator may reverse the pitch of the blades to a desired degree during flight to retard the speed of the craft as in landing. The pitch of the blades may also be reversed to retard or brake the fall of a plane in a nose dive or under other circumstances.

Various changes may be made in the details of construction and arrangement of parts without departing from the spirit of the invention or the scope of the subjoined claims.

What I claim is:

1. In a reversible propeller, the combination with a driven shaft, having a cylinder formed in an end thereof and an intake communicating with the cylinder to admit a fluid under pressure, of a hub rotatable with the shaft, propeller blades extending into the hub and relatively movable therein, said hub comprising a hollow casting having openings therein to receive the propeller blade ends, a removable cover plate for the hub, means enclosed within the hub for rotating the blades therein in one direction, said means including a plunger extending through the hub and into the cylinder in the driven shaft, and means carried by said cover plate and engaging said first named means for rotating the blades in an opposite direction.

2. In a reversible propeller, a hub comprising a hollow casting, blades extending from the hub and rotatable therein, pinions carried by the blade ends within the hub, the pinions being of less diameter than the blade ends to permit axial removal of the blades from the hub, means within the hub to rotate said blades, a cover plate for the hub, and bearings within the hub for rotatably supporting the blade ends, said bearings having complementary parts and being removable through the opening covered by said cover plate.

3. The combination with a driven shaft, having an axial opening in its forward end, a hub carried by said shaft and propeller blades extending into the hub and relatively movable therein, of a rack member within the hub, pinions on the ends of the blades extending into the hub and in mesh with said rack member, a plunger rigidly carried by the rack member, having its free end extending through the hub and into the opening in the driven shaft, and means for admitting a fluid under pressure into the opening of the driven shaft and against the plunger, whereby the pitch of said blades may be varied in one direction.

In testimony whereof, I hereunto affix my signature, this 18th day of August, 1928.

FLORIAN DE NARDE.